(12) United States Patent
Kikuchi

(10) Patent No.: US 7,616,251 B2
(45) Date of Patent: Nov. 10, 2009

(54) CAMERA HAVING FOCUS DETECTION DEVICE

(75) Inventor: Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 668 days.

(21) Appl. No.: 11/245,687

(22) Filed: Oct. 8, 2005

(65) Prior Publication Data

US 2006/0081760 A1     Apr. 20, 2006

(30) Foreign Application Priority Data

Oct. 15, 2004   (JP) ............................. 2004-301552
Aug. 30, 2005   (JP) ............................. 2005-249672

(51) Int. Cl.
*G03B 13/00*   (2006.01)
*H04N 5/232*   (2006.01)

(52) U.S. Cl. ................ 348/345; 348/222.1; 348/333.02

(58) Field of Classification Search ................ 348/345, 348/346, 348, 349, 350
See application file for complete search history.

(56) References Cited

U.S. PATENT DOCUMENTS 5,499,074 A * 3/1996 Ohsawa et al. ............... 396/121
5,512,974 A * 4/1996 Abe et al. .................... 348/169
6,175,692 B1 * 1/2001 Onoda et al. ................. 396/104
6,670,992 B2 * 12/2003 Irie ............................. 348/350
7,158,182 B2 * 1/2007 Watanabe et al. ........... 348/345
2002/0057908 A1 * 5/2002 Otani .......................... 396/51
2003/0179310 A1 * 9/2003 Irie ............................. 348/349
2006/0017835 A1 * 1/2006 Jacobsen ..................... 348/345
2006/0028574 A1 * 2/2006 Lee ............................. 348/345

FOREIGN PATENT DOCUMENTS

JP         08-262319       10/1996
JP         2001-264619      9/2001

* cited by examiner

*Primary Examiner*—Tuan V Ho
*Assistant Examiner*—Gevell Selby
(74) *Attorney, Agent, or Firm*—Straub & Pokotylo; John C. Pokotylo

(57) ABSTRACT

In a camera having a focus detection device which detects a focus state of an object at a plurality of focus detection spots in an imaging area, there are provided an operation portion which selects an arbitrary focus detection spot in the imaging area, and a setting portion which sets the focus detection spot selected by the operation portion as a focus detection spot group. A signal used to set a focus state of the focus detection spot in the thus set group is output by an AF sensor, an arithmetic operation portion detects the focus state of the focus detection spot based on an output from this AF sensor, and a lens drive portion drives a focus optical system to adjust its focus based on a detection result of the focus state obtained by the arithmetic operation portion.

2 Claims, 11 Drawing Sheets

CAMERA HAVING FOCUS DETECTION DEVICE

CROSS-REFERENCE TO RELATED APPLICATION

This application is based upon and claims the benefit of priority from prior Japanese Patent Application Nos. 2004-301552, filed Oct. 15, 2004 and 2005-249672, filed Aug. 30, 2005, the entire contents of which are incorporated herein by reference.

BACKGROUND OF THE INVENTION

1. Field of the Invention

The present invention relates to a camera having a focus detection device, and more particularly to a camera having a focus detection device capable of detecting focus states of a plurality of spots in an imaging area.

2. Description of the Related Art

Various kinds of propositions have been conventionally made in relation to a focus detection device capable of detecting focus states with respect to a plurality of focus detection spots in an imaging area by arranging the plurality of spots in the imaging area. For example, a focus detection device disclosed in Japanese Patent Application Laid-open No. Hei8-262319 or Japanese Patent Application Laid-open No. 2001-264619 divides a plurality of focus detection spots in an imaging area into groups and performs focus detection of the focus detection points in one group only. By doing so, a focus detection calculation can be executed at a high speed.

Furthermore, in the focus detection device according to the prior art, a operator can select an arbitrary group from a plurality of focus detection spot groups. As a result, an operation workload of selecting a focus detection spot can be reduced, and hence the operator can dedicate himself/herself to framing or the like.

BRIEF SUMMARY OF THE INVENTION

A camera according to the present invention is a camera having a focus detection device which detects a focus state of an object at a plurality of focus detection spots in an imaging area, and has an operation portion which selects at least one arbitrary focus detection spot in the imaging area and a setting portion which sets the focus detection spot selected by the operation portion as a member of a focus detection spot group. A signal for detecting a focus state of a focus detection spot in the thus set group is output by an AF (Auto Focus) sensor, an arithmetic operation portion detects a the focus state of the focus detection spot based on the output from this AF sensor, and a lens drive portion drives a focus optical system to adjust its focus based on the detection result of the focus state obtained by the arithmetic operation portion.

A focus detection spot group can be freely selected from the plurality of focus detection spots in the imaging area and a focus adjusting operation is carried out with respect to this focus detection spot group in this manner, the focus of an object intended by the camera operation can be readily adjusted. For example, a focus detection spot group can be set in accordance with a shape or a size of an object.

Moreover, a shape of an already set focus detection spot group can be changed in accordance with an operation of the operation portion. By doing so, a shape or a size of the focus detection spot group can be finely adjusted in accordance with an object. For example, a shape of the focus detection spot group can be changed by adding or deleting a focus detection spot selected by the operation portion.

As a concrete example, when a focus detection spot selected by the operation portion is placed in a range of a currently set focus detection spot group, this focus detection spot is deleted from the set focus detection spot group, and/or when the focus detection spot selected by the operation portion is placed outside the range of the currently set focus detection spot group, this focus detection spot is added to the set focus detection spot group.

Additionally, when the camera further comprises a release member which instructs an exposure preparatory operation and an exposure start operation, a shape of the focus detection spot group can be changed during an image capturing standby mode, or period after instructing the exposure preparatory operation and before instructing the exposure start operation by the release member.

When the camera includes a display portion, a focus detection spot which is currently set as a focus detection spot group can be displayed distinctively from a focus detection spot which is not currently set as the focus detection spot group when setting the focus detection spot group. As an example of the display portion, there is a LCD (Liquid Crystal Display) monitor or a finder.

The arithmetic operation portion can select a detection result of a focus state concerning one focus detection spot (e.g., a detection spot detecting the nearest object part) from detection results of focus states concerning a plurality of focus detection spots included in the focus detection spot group set by the setting portion. Further, based on this selection result, the drive portion drives the focus optical system to adjust its focus based on the detection result of the focus state concerning the selected focus detection spot.

Alternatively, the arithmetic operation portion can calculate an average value of focus states of the plurality of focus detection spots included in the focus detection spot group, and the drive portion can drive the focus optical system to adjust its focus based on the average value.

When an attitude detection portion which detects an attitude of the camera is further provided, and the attitude detection portion detects that an attitude of the camera is changed from a landscape position to a portrait position or from the portrait position to the landscape position, the control portion can change a shape of the focus detection spot group set by the setting portion in accordance with the change in the attitude. By doing so, the shape of the focus detection spot group does not have to be changed on an operator side in accordance with the change in the attitude of the camera.

In this case, when the number of focus detection spots in a vertical direction is the same as that in a lateral direction in an imaging area, the control portion may equalize arrangements of focus detection point groups before and after a change in the attitude. Furthermore, when the number of focus detection spots in the vertical direction is different from that in the lateral direction in the imaging area, the control portion may set the same or different numbers of the focus detection spots before and after a change in the attitude.

In other words, according to the camera of the present invention, a operator can freely set a shape of a focus detection spot group. In this case, focus detection spots can be freely added or deleted with respect to an already set focus detection spot group. Furthermore, focus detection points in the focus detection spot group alone are a target of focus detection. Of course, in an actual arithmetic operation of a focus detection value, all focus detection spots in the focus detection spot group may be determined as an arithmetic operation target in order to calculate a focus detection value (e.g., an average of distances is calculated), or some focus detection spots (e.g., a detection spot detecting the nearest object part) may be further extracted from the focus detection spots in the focus detection spot group. In any case, a focus detection spot which is not included in the focus detection spot group is not a target of the focus detection arithmetic operation. A focus detection spot set in the camera can be displayed in a monitor or a finder. Moreover, a operator can freely set a focus detection spot group by, e.g., operating an operation member or touching a monitor screen while viewing the monitor or the finder.

Performing a setting of a focus detection spot group with a high degree of freedom in this manner can increase a possibility that AF is correctly executed with respect to an objected intended by the camera operation.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

Figure 1:
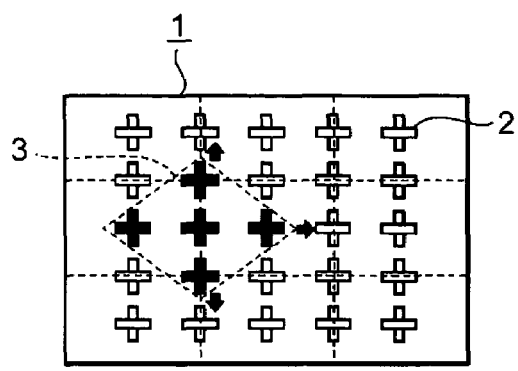
FIG. 1 is a view illustrating a concept of a camera having a focus detection device according to an embodiment of the present invention.

FIG. 1 is a view illustrating a concept of a camera having a focus detection device according to an embodiment of the present invention. There are 25 focus detection spots 2 in an imaging area 1, and a operator can set a focus detection spot group 3 having an arbitrary shape from these spots 2.

For example, in the example depicted in FIG. 1, when the operator operates an operation portion to select the focus detection spots 2, the focus detection spot group 3 is set as a cross type group consisting of five focus detection spots 2. In this state, the operator can further expand the focus detection spot group 3 in directions indicated by arrows in the drawing, or narrow the same. That is, the camera side can not only set the focus detection spot group 3 to an arbitrary shape intended by the operator but also add or delete arbitrary focus detection spots 2 with respect to the already set focus detection spot group 3 in order to change the shape of the focus detection spot group 3. As a result, it is possible to set the focus detection spot group 3 in which an intention of the operator is sufficiently reflected.

Further, in this embodiment, focus detection points can be set based on a focus detection spot selection mode (which will be referred to as a group mode hereinafter) in which a group setting such as shown in FIG. 1 can be performed as well as a focus detection spot selection mode (a single-point mode) in which a operator selects one from all focus detection spots shown in FIG. 1 and a focus detection spot selection mode (a multi mode) in which the camera side automatically selects one from all focus detection spots shown in FIG. 1.

Figure 2:
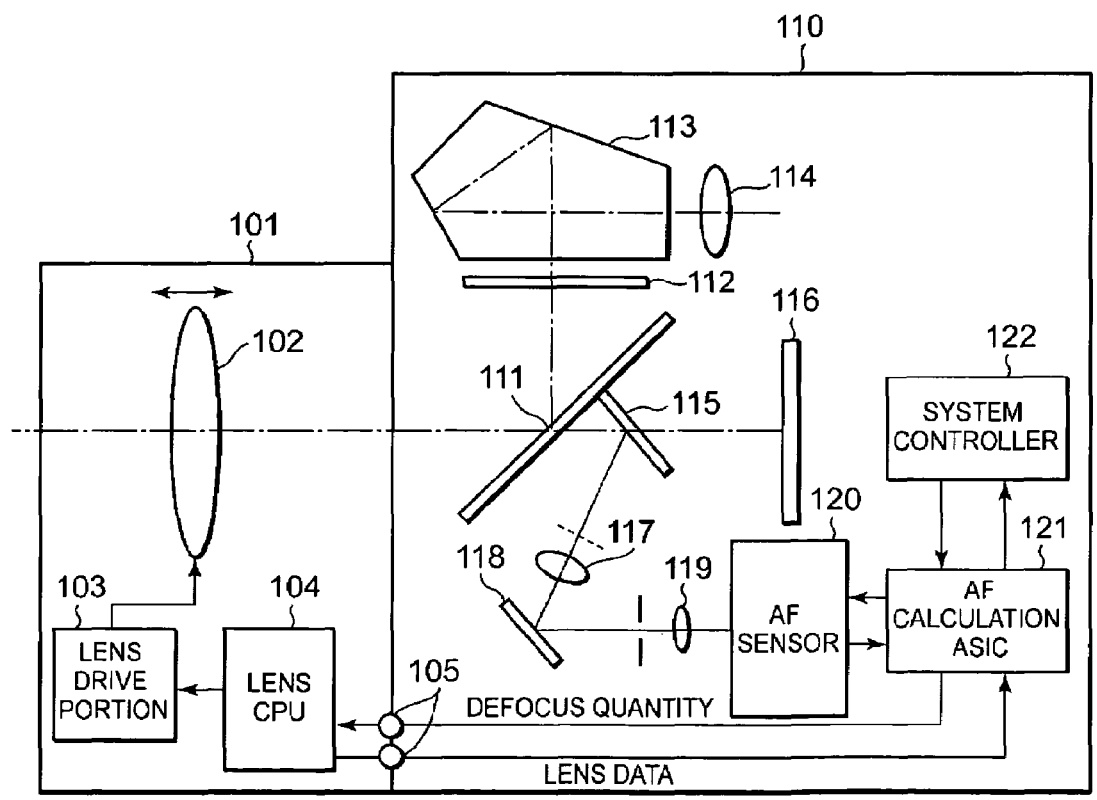
FIG. 2 is a view showing a configuration concerning a focus state detecting operation in such a camera having a focus detection device capable of setting a focus detection spot group as depicted in FIG. 1.

FIG. 2 is a view showing a configuration concerning a focus state detecting operation in the camera having the focus detection device capable of setting such a focus detection spot group as illustrated in FIG. 1. That is, in this focus detection device, the focus detecting operation is carried out with respect to a focus detection spot group selected to have an arbitrary shape by a operator. Here, in FIG. 2, a single-lens reflex camera which is of a lens interchangeable type is assumed. That is, the camera shown in FIG. 2 has an interchangeable lens 101 and a camera body 110.

The interchangeable lens 101 is detachably mounted on the camera body 110 through a non-illustrated camera mount provided on a front surface of the camera body 110. A focus lens 102, a lens drive portion 103 and a lens CPU 104 are provided in this interchangeable lens 101.

The focus lens 102 is a focus adjustment lens included in an image capturing optical system and driven by a motor (not shown) in the lens drive portion 103 in an optical axis direction thereof (a direction indicated by an arrow in FIG. 2). Here, although the actual image capturing optical system is constituted of a plurality of lenses, the focus lens 102 only is shown in FIG. 2. The lens drive portion 103 has a motor and its drive circuit (a motor driver). The lens CPU 104 is a control circuit which performs control and the like of the lens drive portion 103. This lens CPU 104 can communicate with an AF calculation ASIC 121 in the camera body 110 through a communication connector 105. Lens information such as focus lens manufacture irregularity information or focus lens aberration information previously stored in the lens CPU 104 is transmitted from the lens CPU 104 to the AF calculation ASIC 121.

Furthermore, the camera body 110 has the following configuration.

A light beam from an object (not shown) which has entered the camera body 110 through the focus lens 102 in the interchangeable lens 101 is reflected by a main mirror 111 and reaches an eyepiece lens 114 through a focusing screen 112 and a penta prism 113. As a result, a state of the object can be observed.

Here, a central portion of the main mirror 111 is a half mirror, and a part of a light beam is transmitted through the half mirror portion and reflected by a sub-mirror 115 set on the main mirror 111 when the main mirror 111 is set at a down position (an illustrated position). It is to be noted that the sub-mirror 115 is folded when the main mirror 111 is set at an up position. Moreover, an imaging element 116 which performs photoelectric conversion of an object image transmitted through the image capturing optical system is arranged behind the main mirror 111. That is, when the main mirror 111 is set at the up position, an image of a light beam transmitted through the focus lens 102 is formed on the imaging element 116 and subjected to photoelectric conversion.

Additionally, a light beam reflected by the sub-mirror 115 is led to an AF optical system (constituted of a condenser lens 117, a total reflection mirror 118, a separator lens 119 and others) which performs automatic focus detection, transmitted through this AF optical system and led to an AF sensor 120. Further, after the light beam enters the AF sensor 120, this incident light beam is converted into an electric signal. Furthermore, this electric signal output (a sensor output) is input to the AF calculation ASIC 121. In the AF calculation ASIC 121 as a focus state detecting portion, a later-described AF calculation is executed based on input sensor data. This AF calculation result is input to a system controller 122, and the focus lens 102 is driven to adjust the focus by the system controller 122 through the lens drive portion 103.

The AF optical system and the AF sensor will now be described in detail.

Figure 3A:
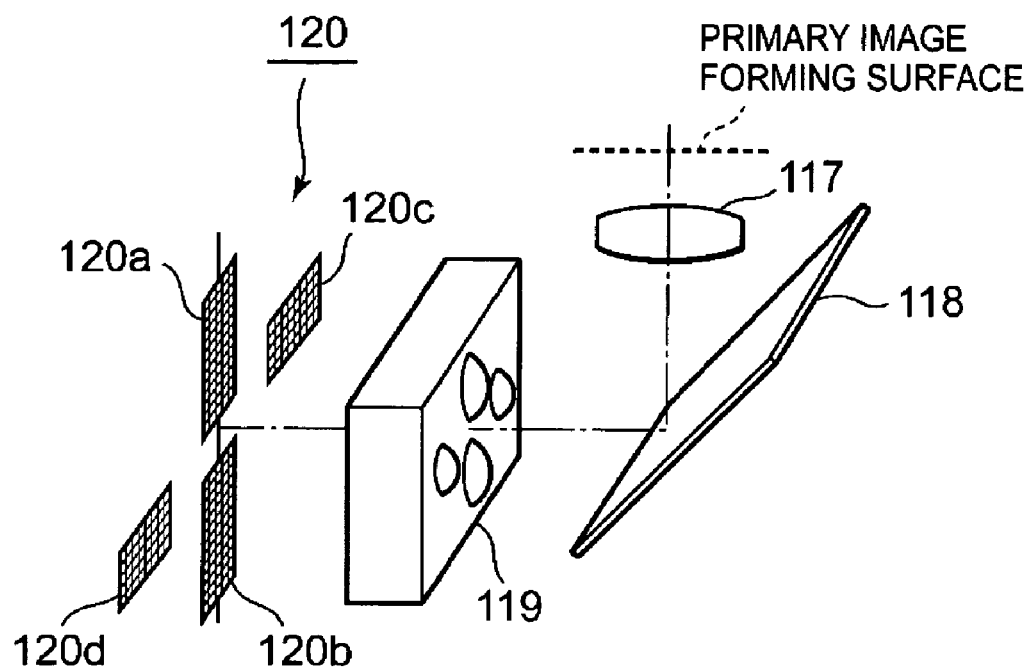
FIG. 3A is a view showing a secondary image forming system of an AF optical system in the camera depicted in FIG. 2.

FIG. 3A is a view schematically showing a secondary image forming system of the AF optical system used in the camera depicted in FIG. 2. As shown in FIG. 3A, the AF optical system has the condenser lens 117, the total reflection mirror 118 and the separator lens 119. Here, a broken line in FIG. 3A indicates a primary image forming surface, and an alternate long and short dash line in the same figure indicates an optical path of the AF optical system. Further, the AF sensor 120 is arranged behind the separator lens 119. Here, the AF sensor 120 in this embodiment has two pairs of sensor arrays, i.e., horizontal line detection sensor arrays 120a and 120b as first sensor arrays having a horizontal direction of an imaging area determined as a detection field and vertical line detection sensor arrays 120c and 120d as second sensor arrays having a vertical direction of the imaging area determined as a detection field.

Figure 3B:
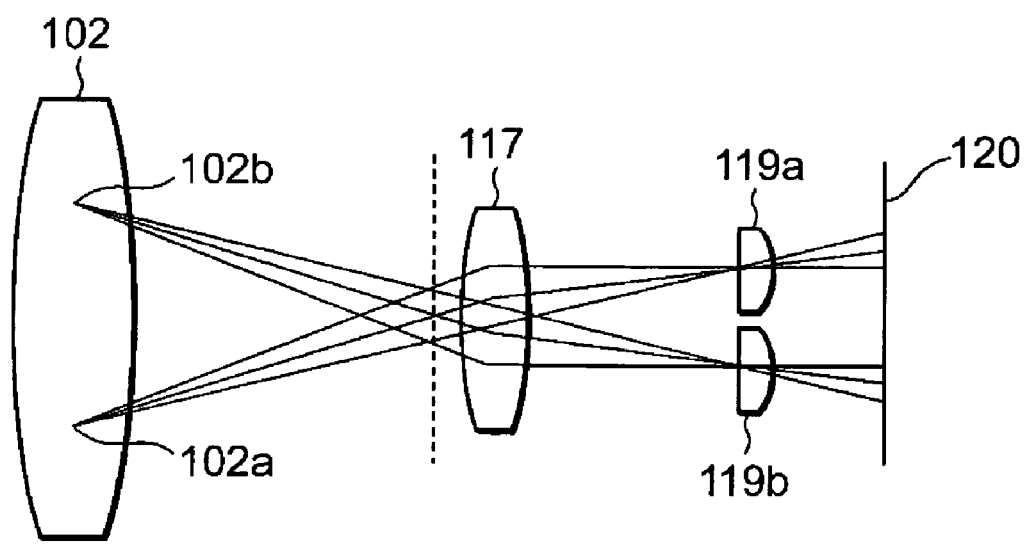
FIG. 3B is a view showing light rays reaching an AF sensor from a focus lens.

FIG. 3B shows a state of a light beam reaching the AF sensor from the focus lens 102 as a state seen from a side surface in FIG. 3A. Here, the total reflection mirror 118 is omitted in FIG. 3B. Furthermore, as to the light beam, a horizontal line detection light beam alone which is used to detect a focus state concerning the lateral direction in the imaging area is illustrated, and a vertical line detection light beam which is orthogonal to the horizontal line detection light beam is omitted. It is to be noted that the following explanation is directed to the horizontal line detection light beam, but the same explanation can be applied in case of the vertical line detection light beam.

In FIG. 3B, a pair of horizontal line detection light beams transmitted through different exit pupils 102a and 102b of the focus lens 102 are reflected by the sub-mirror 115 and then enter the condenser lens 117 where these light beams are condensed. Here, after the pair of condensed horizontal line detection light beams are reflected by the total reflection mirror 118, they enter separator lenses 119a and 119b through a field stop (not shown). Furthermore, the horizontal line detection light beams which have entered these separator lenses 119a and 119b are respectively image-formed in specific regions of the horizontal line detection sensor arrays.

Figure 4:
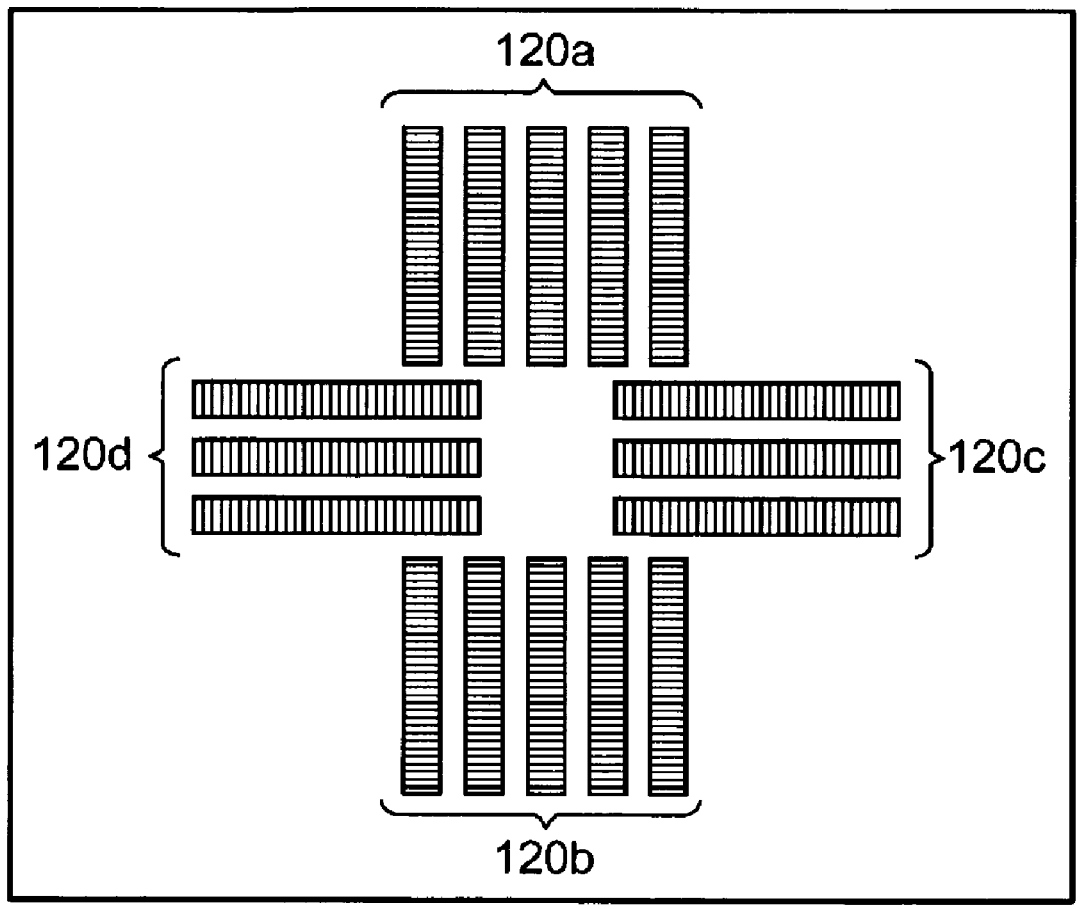
FIG. 4 is a view showing a sensor array arrangement of the AF sensor.

Here, the AF sensor 120 has such a sensor arrangement as shown in FIG. 4 in order to detect focus states of 15 focus detection spots depicted in FIG. 7. That is, each of the horizontal line detection sensor arrays 120a and 120b is constituted of line sensors arranged in five columns. Here, these five line sensors are aligned and arranged in parallel at equal intervals. Moreover, each of the vertical line detection sensor arrays 120c and 120d is constituted of line sensors arranged in three rows. Here, these three line sensors are aligned and arranged in parallel at equal intervals.

As described above, since the focus detection spots are arranged at equal intervals in this embodiment, the line sensors can be arranged at equal intervals to constitute the AF sensor. Therefore, an arrangement of a read circuit (not shown) or the like which reads an output from the AF sensor is easy.

Focus states of the focus detection spots are detected based on outputs from these line sensors. As a focus state detection technique in this example, there is, e.g., a technique using a correlative calculation. The technique using this correlative calculation will now be briefly described hereinafter. It is to be noted that the AF sensor is not restricted to the line sensor according to this embodiment, and it may be an area type sensor or the like.

Prior to carrying out the correlative calculation, the AF calculation ASIC 121 stores input sensor data in a RAM (not shown). Then, the sensor data stored in the RAM is corrected by using correction data which is used to correct non-uniformity of photodiode outputs constituting the respective line sensors. As the correction data in this example, it is possible to use, e.g., data which corrects irregularities in sensor data when observing a uniform luminance surface.

After correction of the sensor data is finished, the correlation calculation is executed. Here, the correlation calculation is a calculation which obtains an interval between two images which have entered between the sensor arrays forming a pair. That is, in the correlative calculation, the sensor data is compared between the sensor arrays forming a pair (a correlation value calculating operation), and a two-image interval with which a correlation value becomes minimum is calculated as a result of this comparison. An object distance or a defocus quantity when driving the focus lens 102 is calculated based on this two-image interval.

Here, when reliability of the image interval obtained as a result of the correlative calculation is low, an incorrect defocus quantity may be possibly calculated, and hence it is preferable to judge reliability of the sensor data prior to calculating the defocus quantity. As such a judgment on the reliability, it is good enough to determine that the reliability is high when, e.g., contrast of the sensor data is greater than a predetermined level and the calculated correlation value is smaller than a predetermined value.

After judging the reliability, focus detection points are selected in accordance with a focus detection spot selection mode of the camera. Here, when the focus detection spot selection mode is the single-point mode, a defocus quantity at one spot specified by a operator is calculated.

Further, when the focus detection spot selection mode is the multi mode, focus detection spots at which sensor data with high reliability are output are selected from all the focus detection spots, a detection spot detecting the nearest distance is selected from the selected focus detection spots, and a two-image interval at this focus detection spot is used to calculate a defocus quantity. Here, when there are a plurality of focus detection spots having substantially the same two-image interval as that of the focus detection spot selected as the detection spot detecting the nearest distance, it is considered that images of these focus detection spots are the same object image, and an average value of the two-image intervals of the plurality of focus detection spots having the same two-image interval is used to calculate the defocus quantity.

Furthermore, when the focus detection spot selection mode is the group mode, the same processing as that in the multi mode is executed with respect to the focus detection spots in a group set by the operator.

As a result of selecting such focus detection spots, the defocus quantity is obtained by using an optically calculated defocus coefficient. An error of the defocus quantity due to irregularities caused by a temperature, irregularities in a body during manufacture, irregularities in the focus lens during manufacture and others is corrected with respect to the thus obtained defocus quantity, thereby acquiring a final defocus quantity.

After the defocus quantity is calculated, the obtained defocus quantity is transmitted to the CPU 104. The CPU 104 controls the lens drive portion 103 based on the transmitted defocus quantity, thereby driving adjustment of the focus of the focus lens 102.

An electric circuit configuration of the camera having the focus detection device mounted therein according to this embodiment will now be described with reference to FIG. 5.

Figure 5:
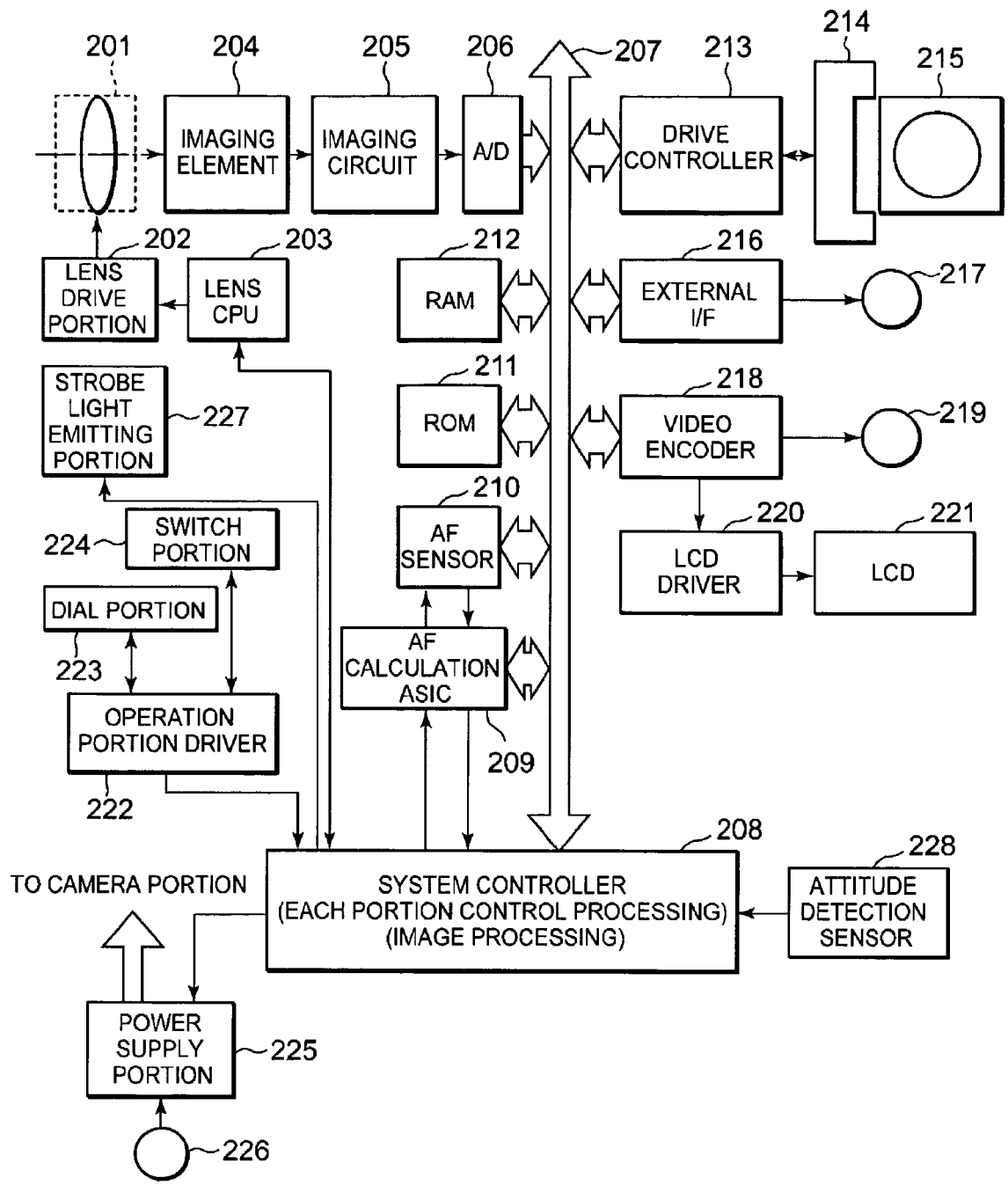
FIG. 5 is a block diagram showing an entire electric circuit configuration of a camera having a focus detection device mounted therein according to an embodiment of the present invention.

FIG. 5 is a block diagram showing an entire electric circuit configuration of the camera having the focus detection device according to this embodiment. It is to be noted that FIG. 5 shows the interchangeable lens and the camera body without discrimination.

In FIG. 5, a zoom lens system 201 including the focus lens 102 is arranged at a predetermined position of the camera. This zoom lens system 201 is illustrated in such a manner that the image capturing optical system including the focus lens 102 is typified by one lens. This zoom lens system 201 is driven by a lens drive portion 202. The lens drive portion 202 is controlled by a lens CPU 203.

An imaging element 204 such as a CCD is arranged in an optical path for an incident light of the zoom lens system 201. This imaging element 204 is connected with a bus line 207 through an imaging circuit 205 and an A/D conversion circuit 206. A system controller 208 and an AF calculation ASIC 209 are connected with the bus line 207. Further, an AF sensor 210 is connected with the AF calculation ASIC 209. Moreover, to the bus line 207 are connected an ROM 211 as a storage portion storing various kinds of control programs or various kinds of data processing information, an RAM 212 for temporarily storing data, and a disk type or card type storage medium 215 through a drive controller 213 and a media drive 214. Additionally, to the bus line 207 are also connected an external input/output terminal 217 through an external I/F portion 216, a video output terminal 219 through a video encoder 218, and an LCD display portion 221 through a video encoder 218 and an LCD driver 220.

Further, the system controller 208 as a control portion controls the entire camera, and is configured to be able to communicate with the lens CPU 203. Furthermore, the system controller 208 is also connected with a dial portion 223 and a switch portion 224 which are used to detect an operating state of an operation portion which inputs each command, e.g., a mode setting to the camera through an operation portion driver 222, and a power supply portion 225 which supplies power to each portion.

Figure 6:
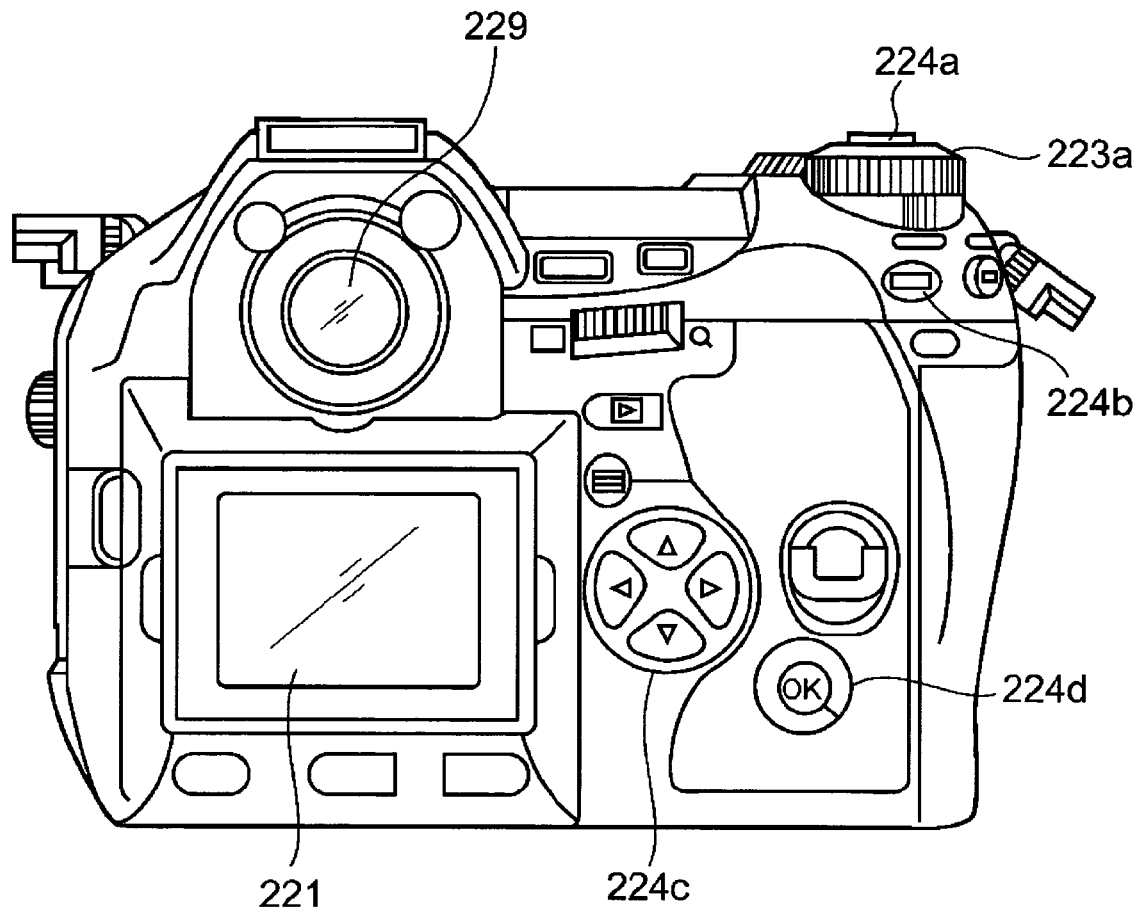
FIG. 6 is a rear view showing an external appearance of the camera.

FIG. 6 is a rear view showing an external appearance of the camera depicted in FIG. 5. As shown in FIG. 6, a mode dial 223a which is used to an image capturing mode of the camera is provided as the dial portion 223 to this camera. Moreover, to this camera are provided a release button 224a as release means for executing an image capturing operation of the camera as an operation portion which changes over a switch state of the switch portion 224, an AF button 224b which is used to set a focus detection mode of the camera, an arrow button 224c as an operation portion which selects or changes a shape of a focus detection spot group or performs any other various selection operation, and an OK button 224d which determines a selected content. Here, the release button 224a is a two-stage button, a first release switch in the switch portion 224 is turned on to instruct an exposure preparatory operation to the camera when the release button 224a is pushed on one step, and a second release switch in the switch portion 224 is turned on to instruct an exposure start operation to the camera when the release button 224a is pushed on two steps.

Additionally, the AF button 224b is also used to set a focus detection spot selection mode. It is to be noted that the members which are used to operate the dial portion 223 or the switch portion 224 are not restricted to those shown in FIG. 6.

Further, an external power supply input terminal 226 which receives power from the outside is provided to the power supply portion 225. Furthermore, a strobe light emitting portion 227 which performs flash light emission is connected with the system controller 208.

Moreover, the system controller 208 is also connected with an attitude detection sensor 228 as attitude detecting means for detecting whether an attitude of the camera is a portrait position or a landscape position.

In such a configuration, when a sensor output from the AF sensor 210 is input to the AF calculation ASIC 209 as a focus state detection portion, the above-described AF calculation is carried out in the AF calculation ASIC 209, thereby obtaining a defocus quantity. Additionally, the lens drive portion 202 is controlled through the lens CPU 203 based on the calculated defocus quantity so that focus driving of the focus lens in the zoom lens system 201 is performed.

Further, when an image of an object (not shown) is formed in the imaging element 204 through the zoom lens system 201, this object image is output from the imaging element 204 as a photoelectrically converted imaging signal. This imaging signal is processed in the imaging circuit 205 provided on the rear stage, and converted into digital image data in the A/D conversion circuit 206. This digital image data is input to the system controller 208 through the bus line 207. Various kinds of signal processing such as JPEG compression/uncompression processing of the input image data are executed in the system controller 208. Here, in signal processing by the system controller 208 or AF calculation in the AF calculation ASIC 209, the RAM 212 is used to temporarily store various kinds of data.

Furthermore, when the disk type or card type recording medium 215 for recording image data or the like is attached in the media drive 214, image data is recorded in this recording medium 215 or the image data is read from the same. At this time, an operation of the media drive 214 is controlled by the drive controller 213. When the image data is read from the recording medium 215, the read image data is transmitted to the system controller 208 through the bus line 207, and the same signal processing as described above is executed.

Moreover, a peripheral device such as a personal computer is connected with the bus line 207 through the external input/output terminal (e.g., a USB terminal) 217 and the external I/F portion 216. Image data or the like held in the peripheral device is fetched through the external input/output terminal 217 and the external I/F portion 216, and the media drive 214 is driven under control of the drive controller 213 so that the image data is recorded in the recording medium 215.

Additionally, an image signal subjected to A/D conversion by the A/D conversion circuit 206 or an image signal read from the recording medium 215 and subjected to JPEG uncompression processing by the system controller 208 is encoded in the video encoder 218 and subjected to predetermined display in the LCD display portion 221. At this time, the LCD display portion 221 is driven by the LCD driver 220. Further, in this camera, a video signal can be externally output through the video output terminal 219.

Figure 7A:
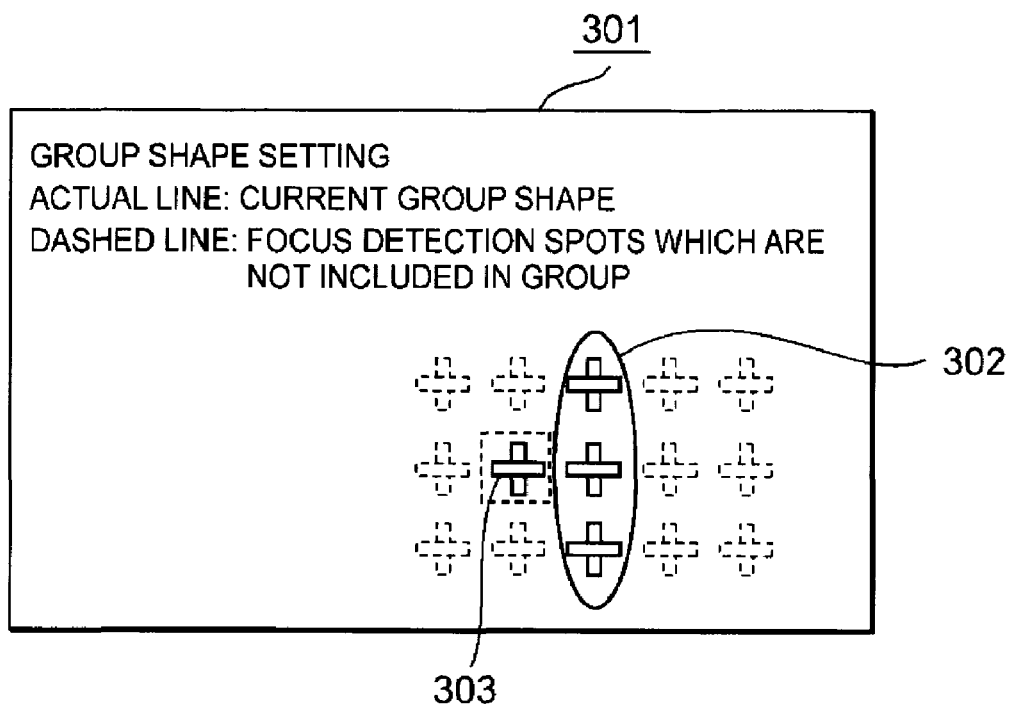
FIGS. 7A and 7B are views showing examples of a focus detection spot group shape setting screen.

A setting of a focus detection spot group shape when a focus detection spot selection mode is the group mode will now be described in detail. FIG. 7A is a view showing a display screen when a operator sets a focus detection spot group shape. Here, this focus detection spot group shape setting screen may be displayed in the LCD display portion 221, or may be subjected to superimpose display in the finder 229 depicted in FIG. 6.

Furthermore, such a focus detection spot group shape setting screen as shown in FIG. 7A can be selected from a menu which is used to perform a camera setting. When the camera is in an image capturing standby mode, a operator can arbitrarily set and change a shape of a focus detection spot group in the focus detection spot group shape setting screen depicted in FIG. 7A.

For example, when the operator first operates the arrow button 224c in the focus detection spot group shape setting screen 301 shown in FIG. 7A, a cursor 303 is moved, and three spots in the vertical direction at the center of the imaging area are selected as focus detection spots by using the OK button 224d. As a result, an arbitrary shape intended by the operator, i.e., the three spots in the vertical direction at the center of the imaging area are set as a focus detection spot group (reference numeral 302). Subsequently, when the operator operates the arrow button 224c, the cursor 303 is moved, and focus detection spots adjacent to the left-hand side of the three spots in the vertical direction at the center of the imaging area are selected by using the OK button 224d. Then, the shape of the focus detection spot group is changed from the state denoted by reference numeral 302 in such a manner that the selected focus detection spots are also included in the already set focus detection spot group 302. Moreover, in case of deleting the already selected focus detection spot, the cursor 303 is moved to this focus detection spot, and the OK button 224d is pressed. In this manner, the focus detection spot group is set to an arbitrary shape intended by the operator in this embodiment. Additionally, when a focus detection spot which is deleted or added is selected by the operator, the shape of the once set focus detection spot group can be changed.

Figure 7B:
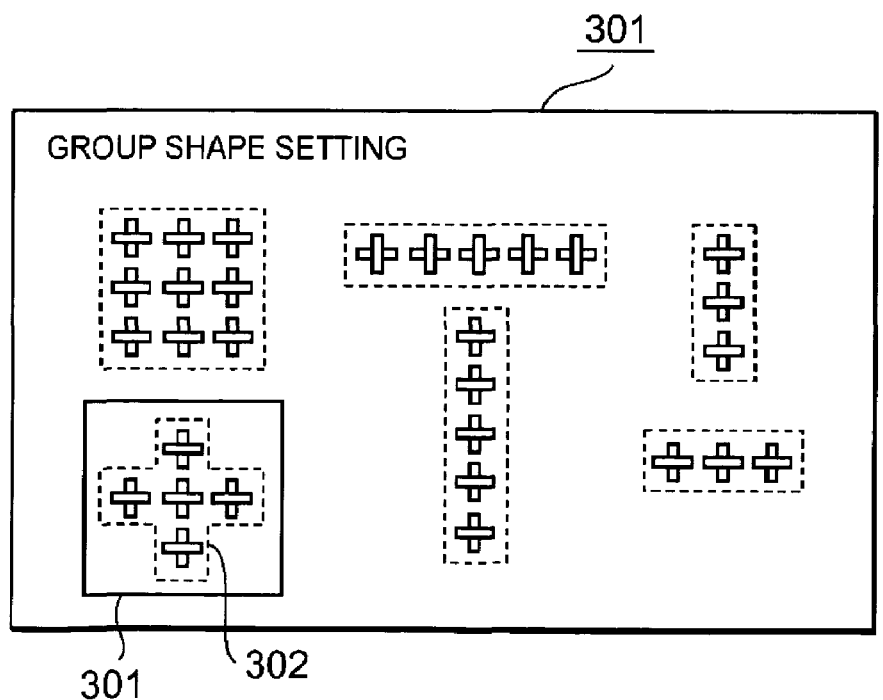

Incidentally, as to a shape of a focus detection spot group, a operator may be able to select a desired focus detection spot group shape from a plurality of group shapes previously stored in the ROM 211 as shown in FIG. 7B.

Further, for example, a function as a focus detection spot group change button may be allocated to the AF button 224b, and such a focus detection spot group shape setting screen 301 as shown in FIG. 7A or FIG. 7B may be displayed when the AF button 224b is pressed. With such a configuration, a focus detection spot group shape can be set and changed during not only the image capturing standby mode but also the exposure preparatory operation. It is to be noted that the focus detection spot group change button may be additionally provided.

Figure 8:
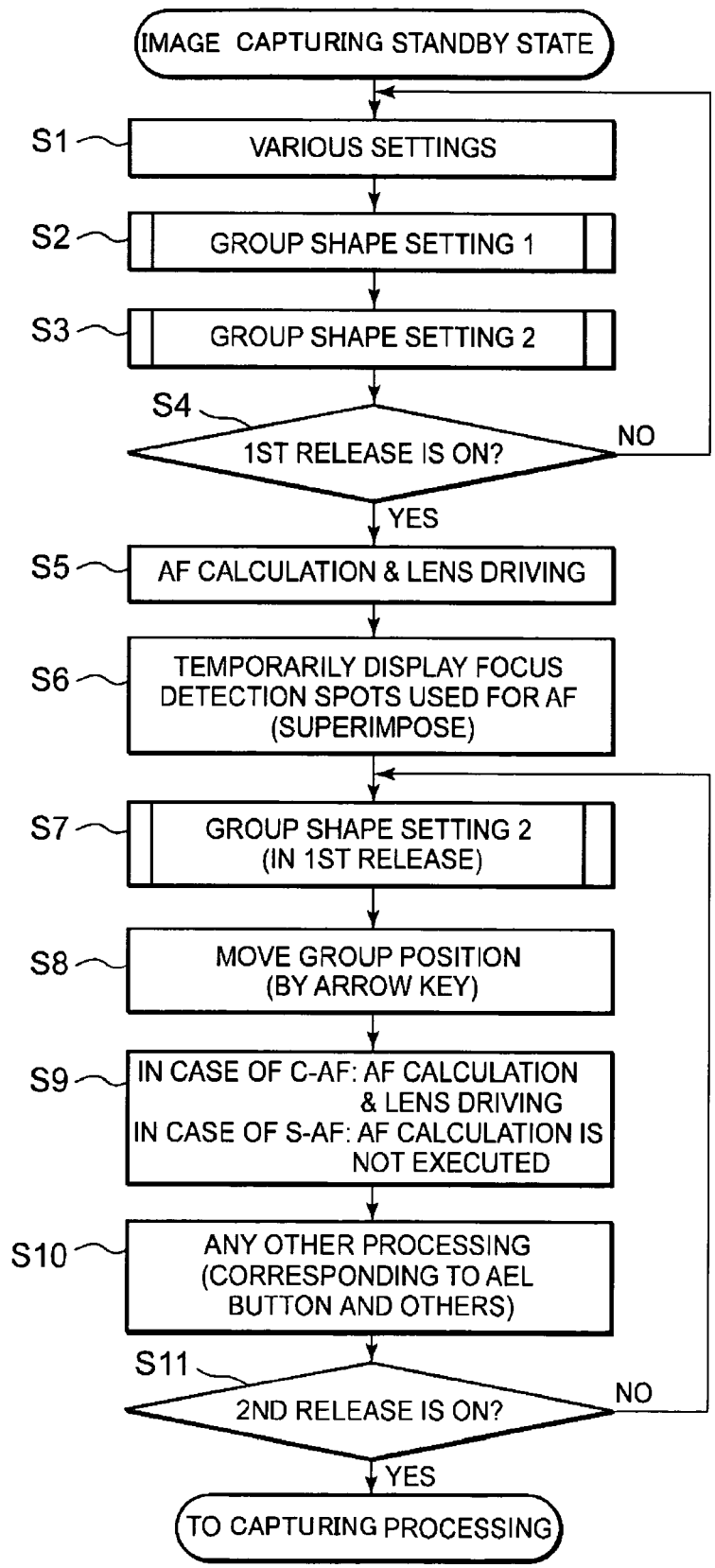
FIG. 8 is a flowchart showing processing from an image capturing standby state to an exposure preparatory operation of the camera having the focus detection device according to an embodiment of the present invention.

FIG. 8 is a flowchart showing a processing procedure from the image capturing standby state to the exposure preparatory operation of the camera having the focus detection device according to this embodiment.

In the image capturing standby state, the system controller 208 (the setting portion and the control portion) displays a menu screen for in which various settings of the camera are performed in the LCD display portion 221 (a step S1), and then executes processing of a later-described group shape setting 1 (a step S2). Thereafter, the system controller 208 (the setting portion and the control portion) performs processing of a later-described group shape setting 2 (a step S3).

Then, the system controller 208 judges whether the first release switch is turned on (a step S4). If it is determined that the first release switch is not turned on in the judgment at the step S4, the control returns to the step S1 to continue the image capturing standby state.

On the other hand, if it is determined that the first release switch is turned on in the judgment at the step S4, the step S4 jumps to a step S5 to execute the exposure preparatory operation. That is, the system controller 208 transmits a command to start execution of the AF calculation to the AF calculation ASIC 209, and the lens drive portion 202 is controlled through the lens CPU 203 based on a defocus quantity obtained as a result of the AF calculation, thereby driving the zoom lens system 201 (the step S5). Moreover, at this time, focus detection spots used in AF are superimpose-displayed in the finder 229 (a step S6). It is to be noted that this display is carried out for a fixed time.

Then, the system controller 208 again executes processing of the group shape setting 2 (a step S7). Even after a shape of a focus detection spot group is set, a operator can move the set focus detection spot group by operating the arrow button 224c (a step S8). When the focus detection spot group is moved, the system controller 208 executes the AF calculation and the lens driving in accordance with a focus detection mode of the camera (a step S9). That is, when the focus detection mode of the camera is a continuous AF mode (a C-AF mode) in which a focus state is detected in compliance with a moving object, the AF calculation and the lens driving are again executed with movement of the focus detection spot group. On the other hand, when the focus detection mode of the camera is a single-AF mode (an S-AF mode) performing a so-called focus lock operation which maintains a focus state when the first release switch is ON, the AF calculation is prevented from being executed even if the focus detection spot group moves while the first release switch is ON.

After the processing of the step S9, the system controller 208 executes any other processing than AF (a step S10). Any other processing includes processing of, e.g., holding an exposure state even in an image capturing mode when an AE lock (AEL) button is pressed.

Thereafter, the system controller 208 judges whether the second release switch is turned on (a step S11). If it is determined that the second release switch is not turned on in the judgment at the step S11, the control returns to the step S7. On the other hand, if it is determined that the second release switch is turned on in the judgment at the step S11, exposure is started and obtained image data is recorded in the recording medium 215.

Figure 9:
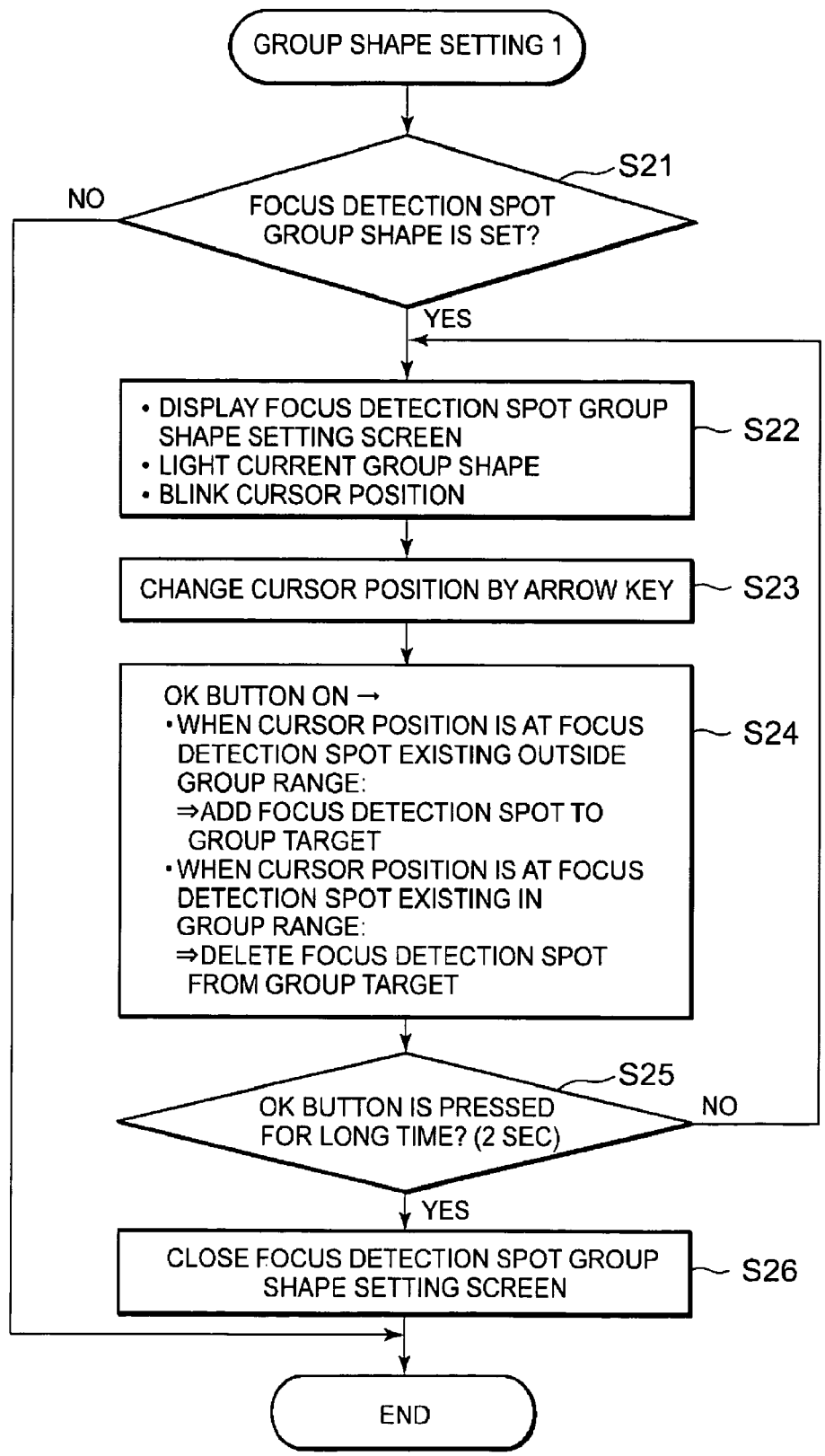
FIG. 9 is a flowchart showing a processing procedure of a group shape setting 1.

FIG. 9 is a flowchart showing a processing procedure of the group shape setting 1 at the step S2 depicted in FIG. 8. This processing of the group shape setting 1 is carried out in the image capturing standby state only.

In FIG. 9, the system controller 208 judges whether a focus detection spot group shape is set in the menu screen displayed in the LCD display portion 221 (a step S21). If it is determined that a focus detection spot group shape is not set in the judgment at the step S21, the processing of the group shape setting 1 is terminated.

On the other hand, if it is determined that a focus detection spot group shape is set in the judgment at the step S21, the step S21 jumps to a step S22, and the focus detection spot group shape setting screen 301 shown in FIG. 7A is displayed in the LCD display portion 221. Additionally, at this time, the currently set focus detection spot group 302 is subjected to light emission, or a position of the cursor 303 is subjected to blinking display (step S22).

In this state, when the arrow button 224c is operated by a operator, the system controller 208 switches display in order to change a position of the cursor 303 in accordance with this operation (a step S23). Then, when the OK button 224d is pressed, if a focus detection spot at the position of the cursor 303 is a focus detection spot which exists outside a range of the currently set focus detection spot group 302, the focus detection spot at the position of the cursor 303 is added to the focus detection spot group 302. On the other hand, when the focus detection spot at the position of the cursor 303 is a focus detection spot which exists in the range of the currently set focus detection spot group 302, the focus detection spot at the position of the cursor 303 is deleted from the focus detection spot group 302 (a step S24). Here, as to the focus detection spot group, an adjacent focus detection spot alone does not necessarily have to be included in the group. Further, in selection in the focus detection spot group shape setting screen 301 shown in FIG. 7B, the focus detection spot group selected by the cursor 303 is set as it is.

Then, the system controller 208 judges whether the OK button 224d is pressed for a predetermined long time (e.g., approximately two seconds) (a step S25). If it is determined that the OK button 224d is not pressed for the predetermined long time in the judgment at the step S25, the control returns to the step S22. On the other hand, if it is determined that the OK button 224d is pressed for a long time in the judgment at the step S25, the focus detection spot group shape setting screen 301 is closed (a step S26), and then the processing of the group shape setting 1 is terminated.

Figure 10:
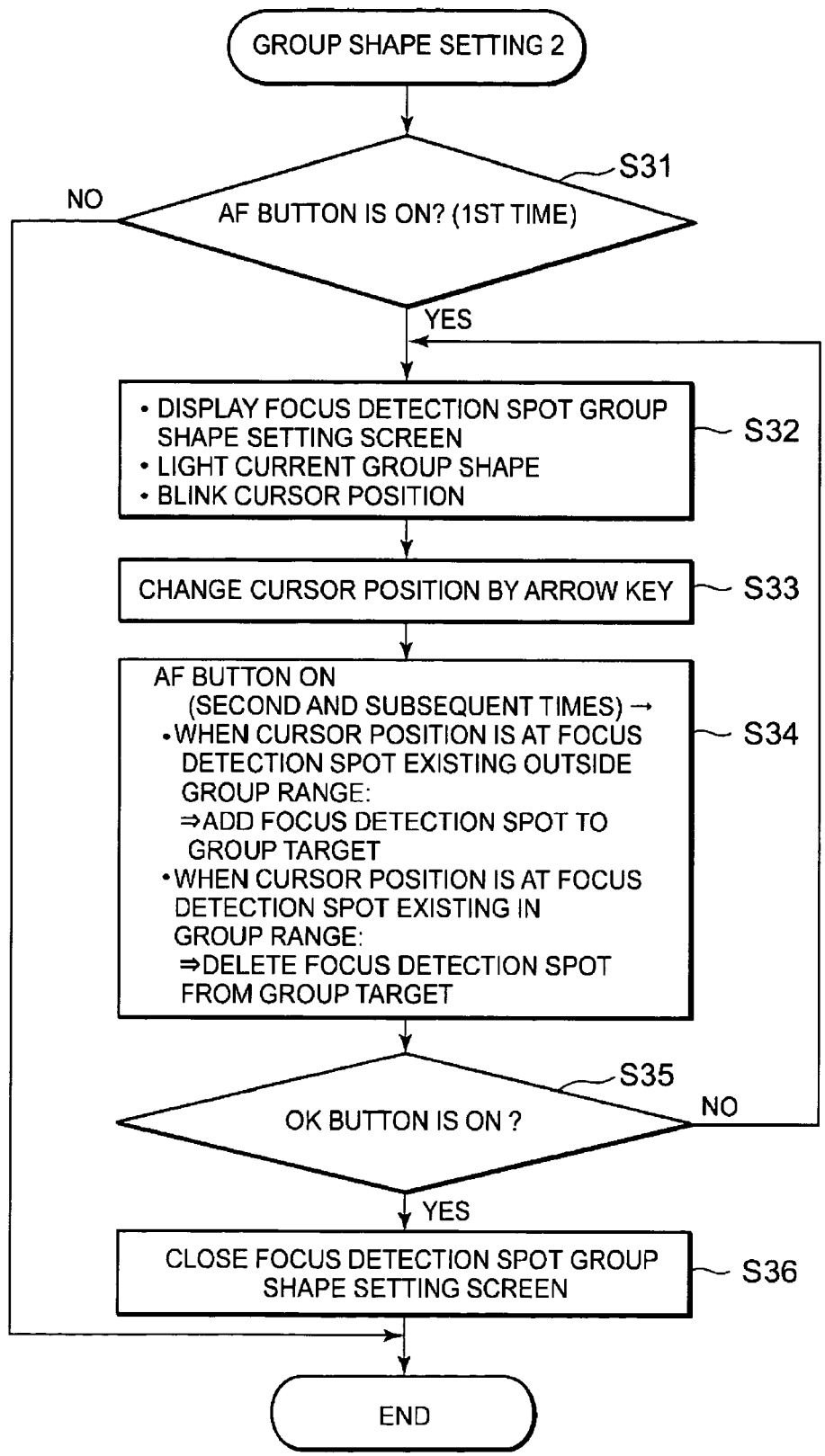
FIG. 10 is a flowchart showing a processing procedure of a group shape setting 2.

FIG. 10 is a flowchart showing a processing procedure of the group shape setting 2 at the step S3 and the step S7 depicted in FIG. 8. This processing of the group shape setting 2 is executed in both the image capturing standby state and the exposure preparatory operation.

In FIG. 10, the system controller 208 judges whether the AF button 224b is turned on by a operator (a step S31). If it is determined that the AF button 224b is not turned on in the judgment at the step S31, the processing of the group shape setting 2 is terminated.

On the other hand, if it is determined that the AF button 224b is turned on in the judgment at the step S31, the step S31 jumps to a step S32 where the focus detection spot group shape setting screen 301 shown in FIG. 7A is displayed in the finder 229. At this time, the currently set focus detection spot group 302 is subjected to light emission, or a position of the cursor 303 is subjected to blinking display (the step S32).

In this state, when the arrow button 224c is operated by a operator, the system controller 208 switches display to change a position of the cursor 303 in accordance with this operation (a step S33). Thereafter, when the AF button 224b is again pressed, if a focus detection spot at the position of the cursor 303 is a focus detection spot which exists outside a range of the currently set focus detection spot group 302, the focus detection spot at the position of the cursor 303 is added to the focus detection spot group 302. On the other hand, if the focus detection spot at the position of the cursor 303 is a focus detection spot which exists in the range of the currently set focus detection spot group 302, the focus detection spot at the position of the cursor 303 is deleted from the focus detection spot group 302 (a step S34). Incidentally, in selection in the focus detection spot group shape setting screen 301 shown in FIG. 7B, the focus detection spot group selected by the cursor 303 is set as it is.

Then, the system controller 208 judges whether the OK button 224d is pressed (a step S35). If it is determined that the OK button 224d is not pressed in the judgment at the step S35, the control returns to the step S32. On the other hand, if it is determined that the OK button 224d is pressed in the judgment at the step S35, the focus detection spot group shape is turned off (a step S36), and then the processing of the group shape setting 2 is terminated.

Here, it is preferable to maintain the same focus detection spot group shape even if an attitude of the camera is changed from a landscape position to a portrait position, for example. Thus, in this embodiment, an attitude of the camera is detected by the attitude detection sensor 228. When a change in an attitude of the camera is detected by this attitude detection sensor 228, the system controller 208 executes processing of varying a shape of the focus detection spot group in accordance with this change in the attitude.

Figure 11A:
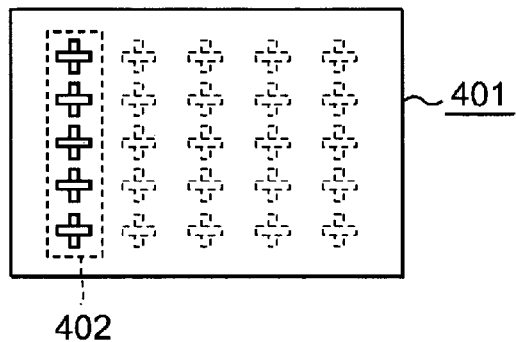
FIGS. 11A and 11B are views of a first example of a change in a focus detection spot group shape corresponding to a change in an attitude of the camera.
Figure 11B:
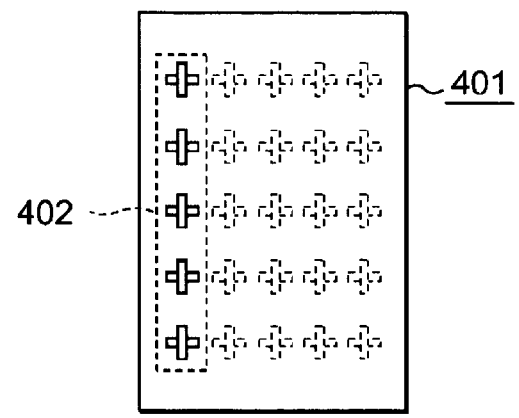

For example, as shown in FIG. 11A, when the number of the focus detection spots in the vertical direction is the same as that in the horizontal direction in the imaging area 401, the system controller 208 performs control in accordance with a change in an attitude of the camera in such a manner that all five focus detection spots in a left end column in FIG. 11A set as a focus detection spot group before an attitude of the camera is changed are determined as a focus detection spot group including all five focus detection spots in a left end column in FIG. 11B even after the attitude of the camera is changed. That is, it is good enough to change a shape of a focus detection spot group 402 from the state shown in FIG. 11A to the state of the focus detection spot group 402 depicted in FIG. 11B.

Figure 12A:
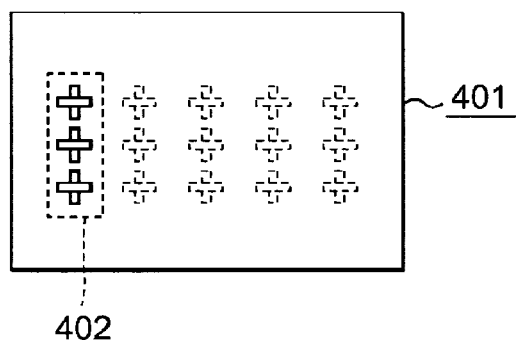
FIGS. 12A and 12B are views of a second example of a change in a focus detection spot group shape corresponding to a change in an attitude of the camera.
Figure 12B:
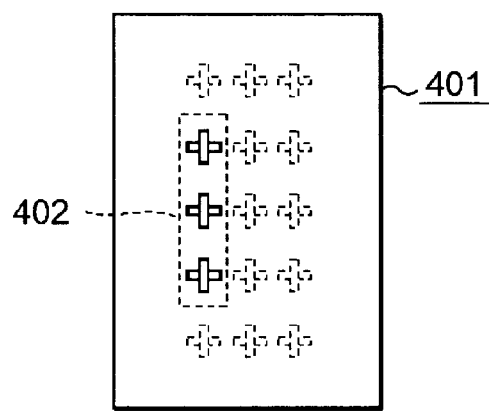
Figure 13A:
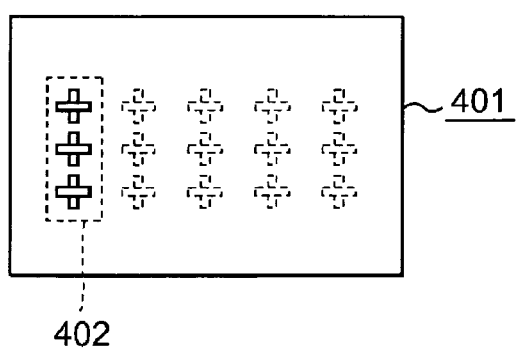
FIGS. 13A and 13B are views of a third example of a change in a focus detection spot group shape corresponding to a change in an attitude of the camera.
Figure 13B:
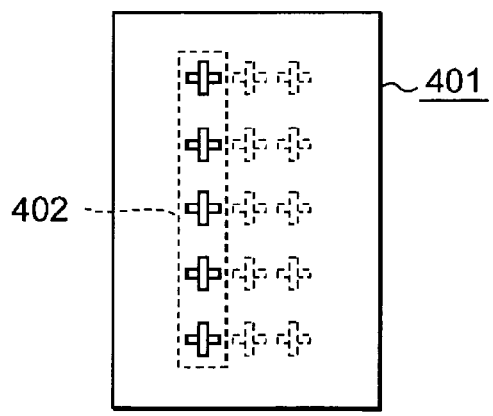
Figure 14:
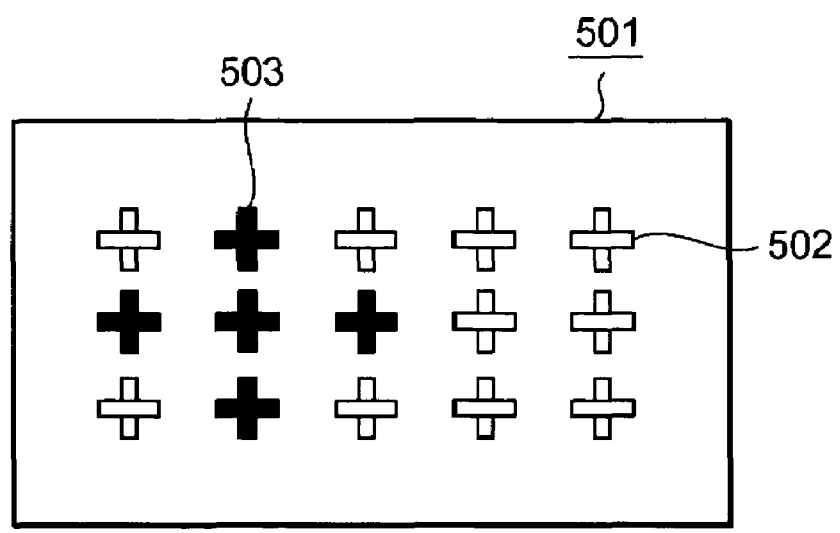
FIG. 14 shows an example of a conventional focus detection spot group.
Figure 15:
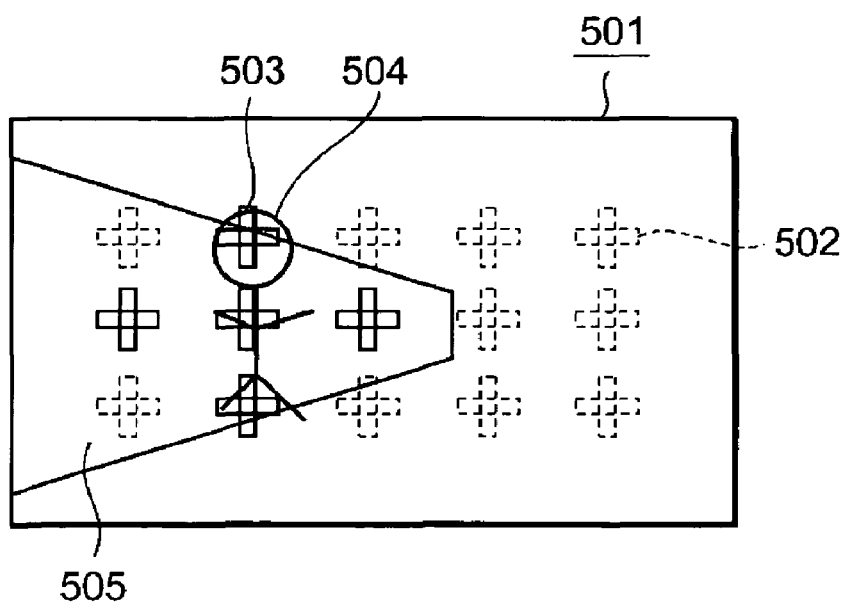
FIG. 15 is a view showing an example of a scene which may not be properly subjected to AF in the conventional focus detection spot group.

On the other hand, as shown in FIG. 12A, when the number of focus detection spots in the vertical direction is different from that in the horizontal direction in the imaging area 401, the system controller 208 performs control in accordance with a change in an attitude shown in FIG. 12B in such a manner that all three focus detection spots in a left end column in FIG. 12A set as a focus detection spot group before the attitude is changed are determined as a focus detection spot group including three focus detection spots excluding an upper end and a lower end in five focus detection spots in a left end column in FIG. 12B after the attitude is changed. That is, the number of the focus detection spots in the focus detection group is matched with the number of the focus detection spots before the attitude is changed. Alternatively, as shown in FIGS. 13A and 13B, a shape of the focus detection spot group may be changed in compliance with a ratio of the focus detection spot numbers in the vertical and horizontal directions. In this case, when the left end column is all set as a focus detection spot group in the landscape state shown in FIG.

13A, the shape of the focus detection spot group is changed in such a manner that the left end column is all determined as the focus detection spot group even in the portrait state shown in FIG. 13B.

As described above, according to this embodiment, it is possible to perform a setting of a focus detection spot group shape with a high degree of freedom in the focus detection spot group shape setting screen. As a result, AF can be properly carried out with respect to an object intended by a operator.

Furthermore, when the focus detection spot group shape setting screen is displayed in the finder, a shape of a focus detection spot group can be set and changed even during the exposure preparatory operation.

Moreover, since a shape of a focus detection spot group is changed in accordance with an attitude of the camera, AF can be properly executed with respect to an object intended by a operator even if an attitude of the camera is suddenly changed.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A camera having a focus detection device which detects a focus state of an object at a plurality of focus detection spots in an imaging area, comprising:
    an operation portion which selects an arbitrary focus detection spot from the plurality of focus detection spots in the imaging area;
    a setting portion which sets the focus detection spot selected by the operation portion as a member of a focus detection spot group with respect to which a focus adjusting operation is carried out;
    an AF sensor which outputs a signal used to detect a focus state of each focus detection spot of the focus detection spot group;
    an arithmetic operation portion which detects a focus state of the each focus detection spot of the focus detection spot group based on the output from the AF sensor; and
    a lens drive portion which drives a focus optical system to adjust its focus based on a detection result of the focus state of the each focus detection spot of the focus detection group detected by the arithmetic operation portion,
    wherein the setting portion changes a shape of the already set focus detection spot group in accordance with an operation of the operation portion,
    wherein the setting portion changes a shape of the focus detection spot group by adding or deleting the focus detection spot selected by the operation portion, and
    wherein, when the focus detection spot selected by the operation portion exists in a range of the currently set focus detection spot group, the setting portion deletes the focus detection spot from the set focus detection spot group.

2. A camera having a focus detection device which detects a focus state of an object at a plurality of focus detection spots in an imaging area, comprising:
    an operation portion which selects an arbitrary focus detection spot from the plurality of focus detection spots in the imaging area;
    a setting portion which sets the focus detection spot selected by the operation portion as a member of a focus detection spot group with respect to which a focus adjusting operation is carried out;
    an AF sensor which outputs a signal used to detect a focus state of each focus detection spot of the focus detection spot group;
    an arithmetic operation portion which detects a focus state of the each focus detection spot of the focus detection spot group based on the output from the AF sensor; and
    a lens drive portion which drives a focus optical system to adjust its focus based on a detection result of the focus state of the each focus detection spot of the focus detection group detected by the arithmetic operation portion,
    wherein the setting portion changes a shape of the already set focus detection spot group in accordance with an operation of the operation portion,
    wherein the setting portion changes a shape of the focus detection spot group by adding or deleting the focus detection spot selected by the operation portion, and
    wherein, when the focus detection spot selected by the operation portion exists outside a range of the currently set focus detection spot group, the setting portion adds the focus detection spot to the set focus detection spot group.

* * * * *

UNITED STATES PATENT AND TRADEMARK OFFICE
CERTIFICATE OF CORRECTION

| | | |
|---|---|---|
| PATENT NO. | : 7,616,251 B2 | Page 1 of 1 |
| APPLICATION NO. | : 11/245687 | |
| DATED | : November 10, 2009 | |
| INVENTOR(S) | : Tetsuo Kikuchi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1066 days.

Signed and Sealed this

Nineteenth Day of October, 2010

David J. Kappos
*Director of the United States Patent and Trademark Office*